United States Patent [19]

Chen

[11] Patent Number: 5,106,116
[45] Date of Patent: Apr. 21, 1992

[54] AUXILIARY SAFETY STRUCTURE FOR A BABY STROLLER

[76] Inventor: Shum M. Chen, P.O. Box 82-144, Taipei, Taiwan

[21] Appl. No.: 773,443

[22] Filed: Oct. 9, 1991

[51] Int. Cl.$^5$ .............................................. B62B 7/08
[52] U.S. Cl. ..................................... 280/642; 297/46
[58] Field of Search ............... 280/638, 639, 641, 642, 280/643, 644, 647, 648, 649, 650, 657, 658, 47.38; 297/16, 46, 48, 49, 50, DIG. 4

[56] References Cited

U.S. PATENT DOCUMENTS

| | | | |
|---|---|---|---|
| 4,412,688 | 11/1983 | Giordani | 280/642 |
| 4,591,176 | 5/1986 | Kassai | 280/642 |
| 4,805,928 | 2/1989 | Nakao et al. | 280/642 |
| 4,993,743 | 2/1991 | Takahashi et al. | 280/642 |

*Primary Examiner*—Andres Kashnikow
*Assistant Examiner*—Richard M. Camby
*Attorney, Agent, or Firm*—Alfred Lei

[57] ABSTRACT

This invention relates to an auxiliary safety structure for a baby stroller and in particular to one which includes a rear stay connected with an engaging member, a handle connected with a seat, a screw inserted through a tube, the engaging member and the rear stay to engage with a nut, a crank arm connecting the rear stay, the handle and the seat, a block arranged within the chamber, and a spring disposed within a chamber of the engaging member and tending to push against the block, whereby the stroller will be kept in expanded condition as long as there is a baby in the stroller thereby preventing the baby from being injured by accidental collapse of the stroller.

1 Claim, 8 Drawing Sheets

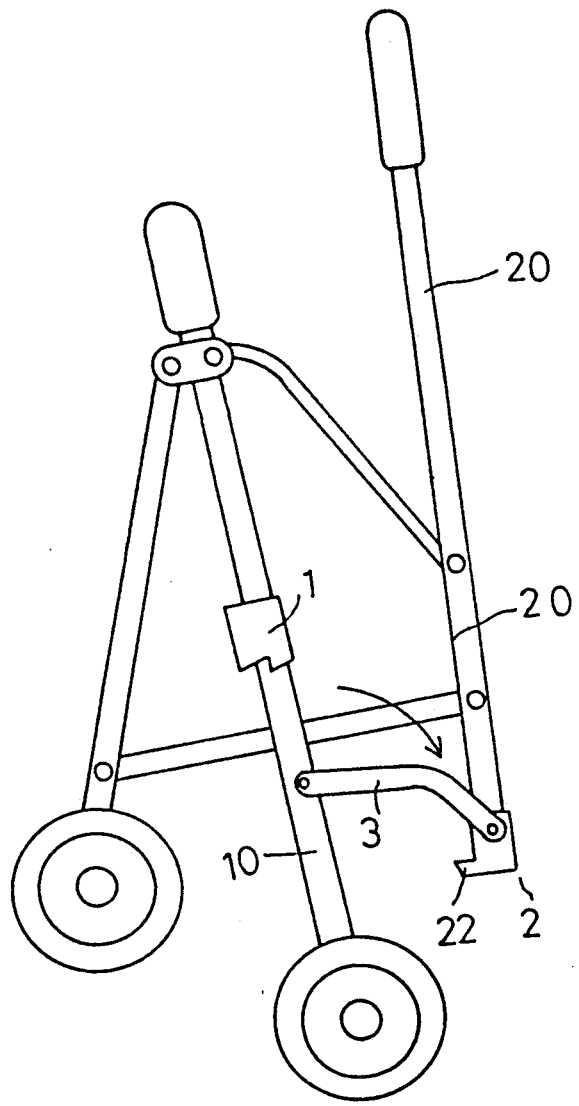
F I G. 7

AUXILIARY SAFETY STRUCTURE FOR A BABY STROLLER

BACKGROUND OF THE INVENTION

It is found that the prior art stroller is often expanded or collapsed accidentally thereby hurting the baby therein. As illustrated in FIG. 8, the collapsible mechanism of such stroller comprises a front wheel support 91, a rear wheel support 92, a backrest support 93, a handle support 94 and seat rods 95 and 96. The handle support 94 is pivotally connected with the backrest support 93. The backrest support 93 is provided with a hook member 97 which is controlled by a press rod 98. When desired to collapse the stroller, it is only necessary to press the press rod 98 to detach the hook member 97 from a protruberance 99. However, since the press rod 98 is arranged at both sides, it is easily pressed by the children inadvertently or deliberately thereby injuring the baby therein.

Therefore, it is an object of the present invention to provide an auxiliary saftety structure for a baby stroller which may obviate and mitigate the above-mentioned drawbacks.

SUMMARY OF THE INVENTION

This invention relates to an auxiliary safety structure for a baby stroller.

It is the primary object of the present invention to provide an auxiliary safety structure for a baby stroller which may ensure the baby stroller not to be folded accidentally.

It is another object of the present invention to provide an auxiliary safety structure for a baby stroller which is simple in construction.

It is still another object of the present invention to provide an auxiliary safety structure for a baby stroller which is economic to produce.

It is still another object of the present invention to provide an auxiliary safety structure for a baby stroller which is easy to operate.

It is a further object of the present invention to provide an auxiliary safety structure for a baby stroller which is facile to manufacture.

Other objects and merits and a fuller understanding of the present invention will be obtained by those having ordinary skill in the art when the following detailed description is read in conjunction with the accompanying drawings.

BRIEF DESCRIPTION OF THE DRAWINGS

FIG. 7 shows the folded condition of the present invention; and

DETAILED DESCRIPTION OF THE PREFERRED EMBODIMENT

Figure 1:
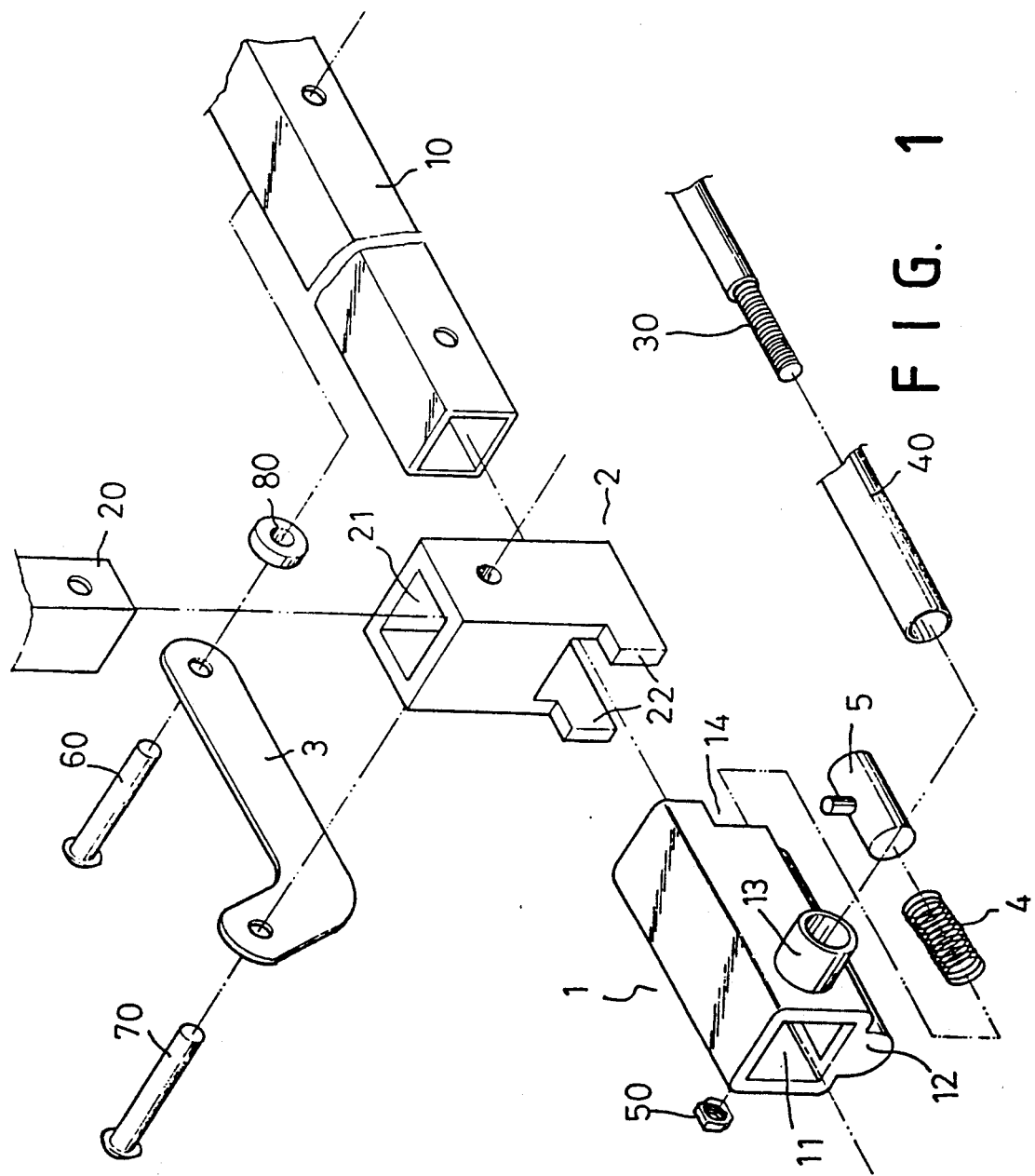
FIG. 1 is an exploded view of the present invention.
Figure 2:
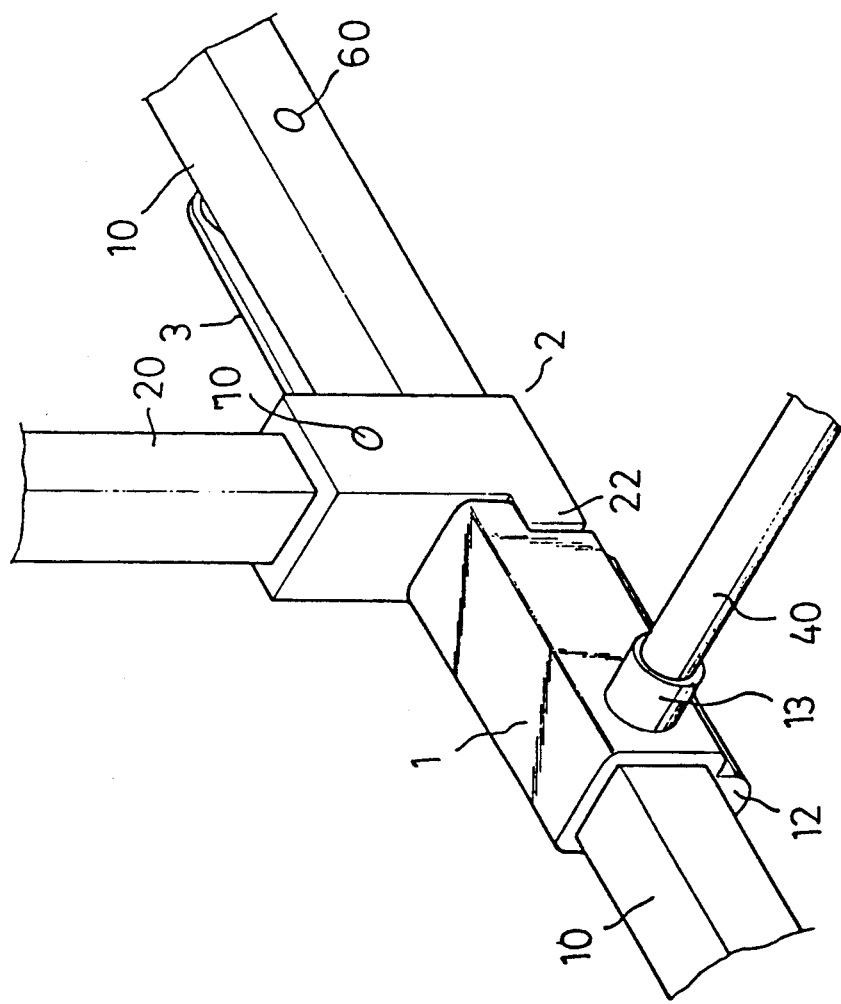
FIG. 2 is a perspective view of the present invetion.
Figure 3:
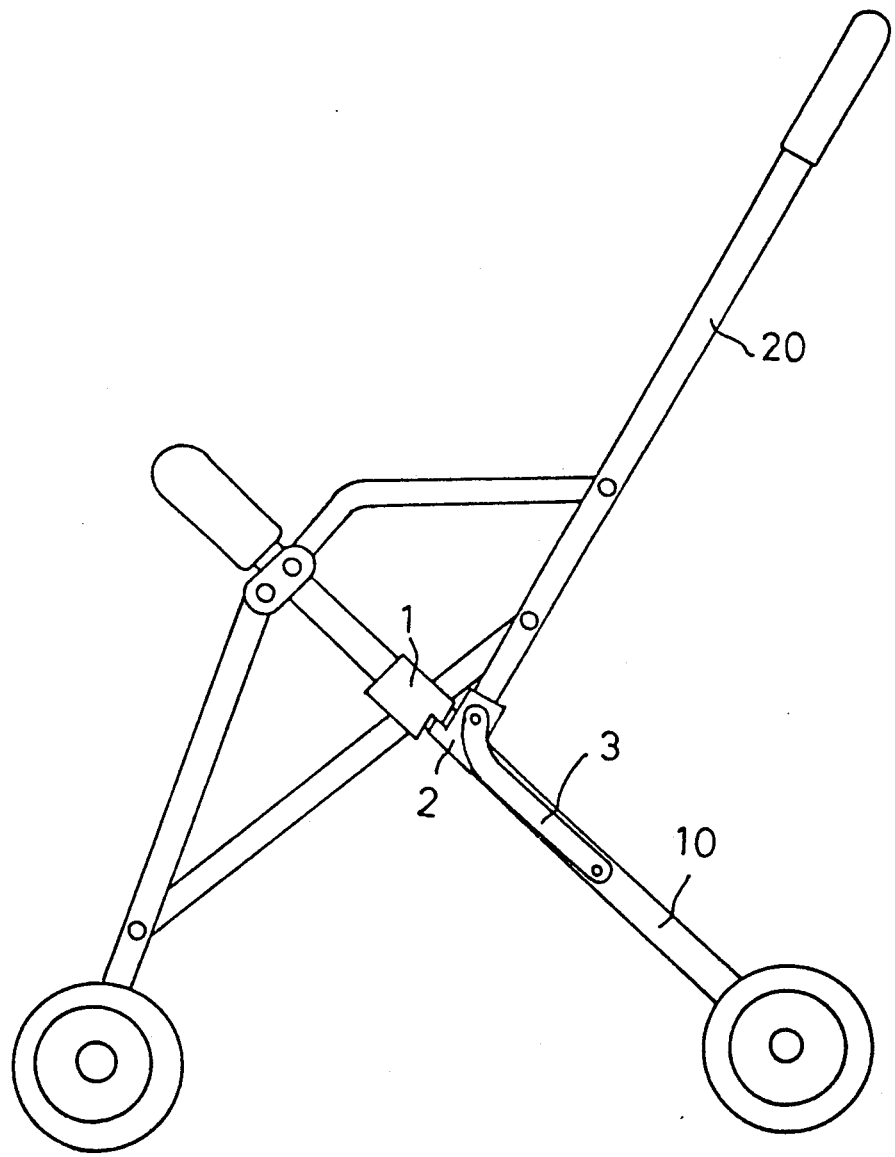
FIG. 3 is a working view of the present invention.

With reference to the drawings and in particular to FIGS. 1, 2 and 3 thereof, the present invention comprises a rear stay 10 and a handle 20 connected with an engaging member 1 and a seat 2 respectively. The handle 20, the seat 2 and the rear stay 10 are connected with a crank arm 3.

The engaging member 1 is formed with a square through hole 11 and a semi-circular chamber 12 in communication with the square through hole 11. Further, the engaging member 1 is provided with a tubular member 13 at one side and a notch 14 at the end, and engaged with an appropriate position of the rear stay 10. A screw 30 is inserted through a tube 40, the tubular member 13, the rear stay 10 and the square hole 11 to engage with a nut 50 so that the tube 40 is closely engaged with the tubular member 13. As the outer diameter of the screw 30 is smaller than the inner diameter of the tube 40, the tube 40 may be moved in unison with the engaging member 1. Hence, the two ends of the engaging member 1 can be used for positioning. In the semi-circular chamber 12 there are disposed a spring 4 and a block 5. The block 5 is located within the rear stay 10 (see FIG. 4A), while the two ends of the spring 4 bear against the block 5 and the end of the chamber 12 respectively so that the engaging member 1 is always pushed by the spring 4 to return to its orginal position.

The seat 2 is formed with a recess 21 sleeving over the lower end of the handle 20 and has two lugs 22 at the bottom.

The crank arm 3 is connected at one end with the rear stay 10 via a pin 60 and a packing 80 and at the other end with the seat 2 and the handle 20 via a pin 70 so that the seat 2 may be engaged or disengaged with the engaging member 1 (see FIGS. 3 and 7).

Figure 4B:
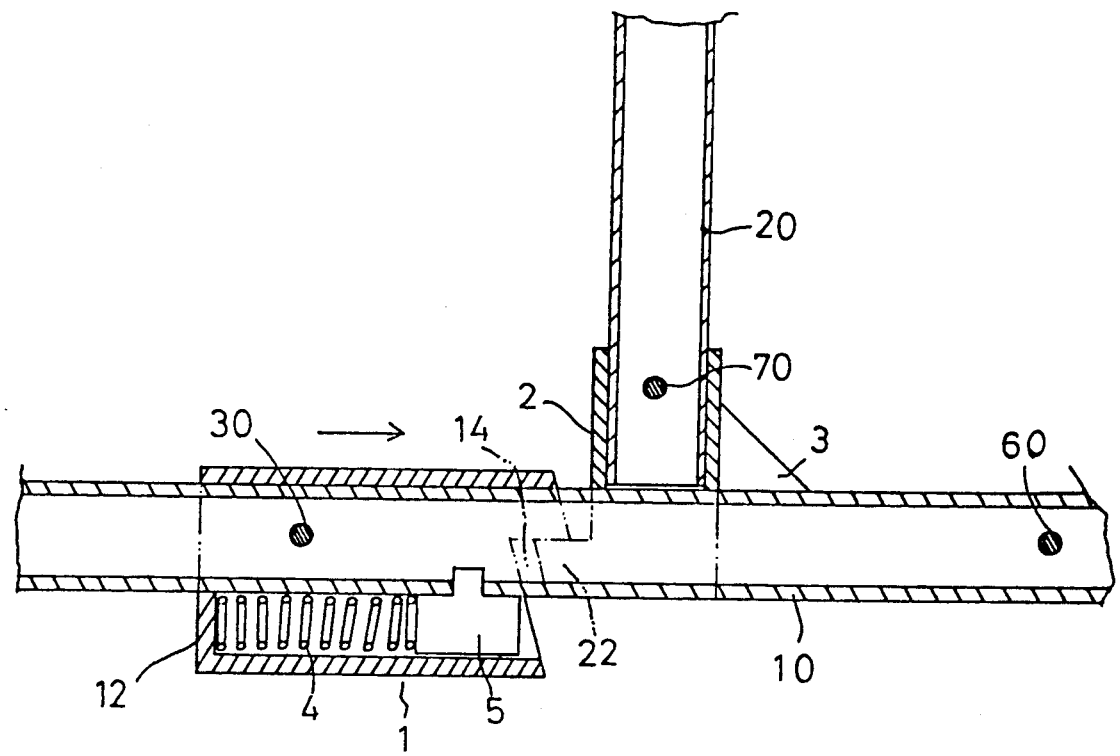
FIG. 4B is a sectional view of FIG. 4A.
Figure 4A:
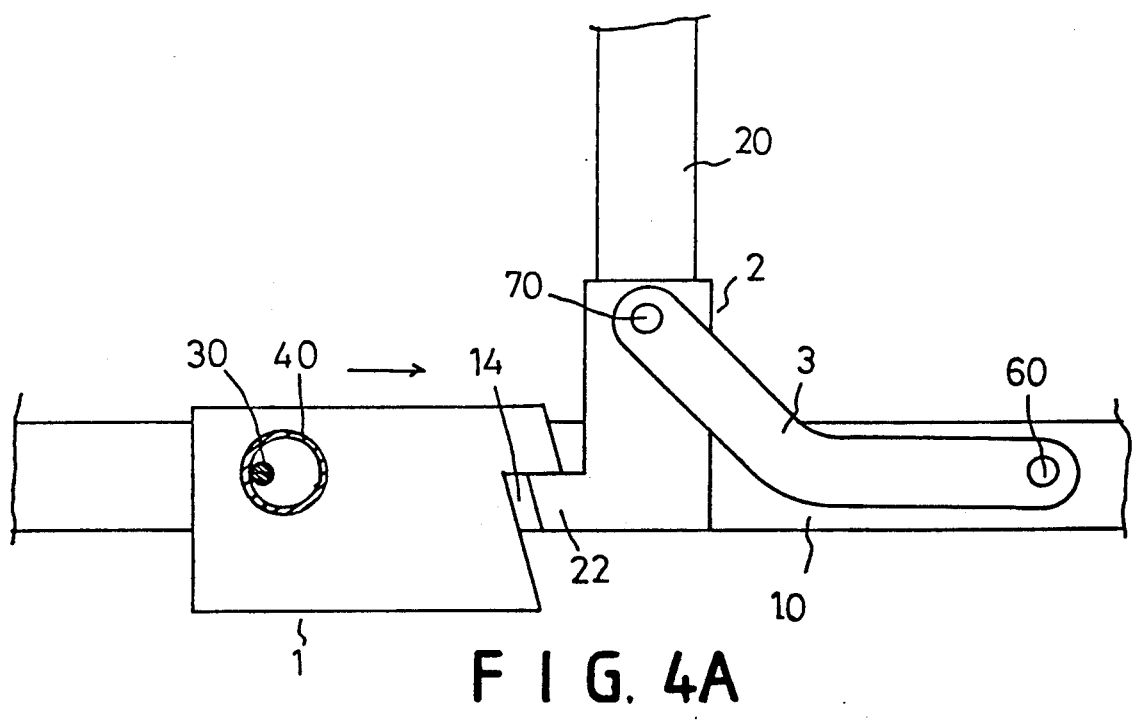
FIG. 4A shows the folded condition of the present invention.

As the baby stroller is expanded for receiving a baby (see FIGS. 3, 4A and 4B), the weight of the baby will exert on the engaging member 1 thereby moving the engaging member 1 downwards and engaging the notch 14 with the lugs 22 of the seat 2 (see FIG. 4A and 4B). In the meantime, the tube 40 on the engaging member 1 bears against the screw 30 fixedly mounted on the rear stay 10 and the spring 4 is being compressed. Hence, unless the baby is carried upwards from the stroller, the engaging member 1 will not disengaged with the seat 2 thereby ensuring the engagement between the engaging member 1 and the seat 2 and therefore, proventing the stroller from being collapsed to injure the baby accidentally.

Figure 5B:
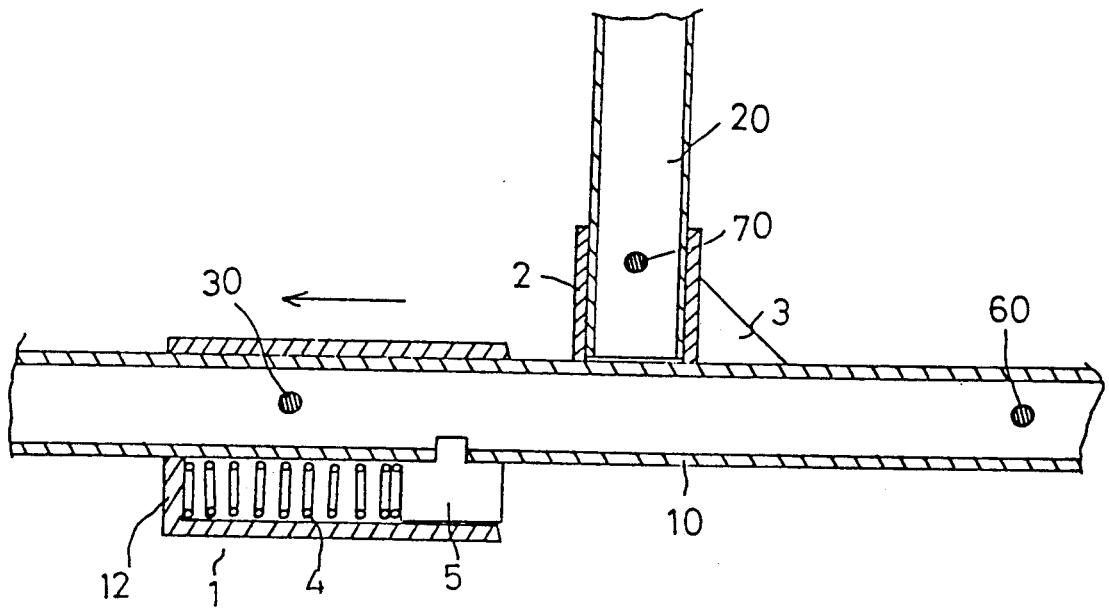
FIGS. 5A, 5B, 6A and 6B show the folding principle of the present invention.
Figure 5A:
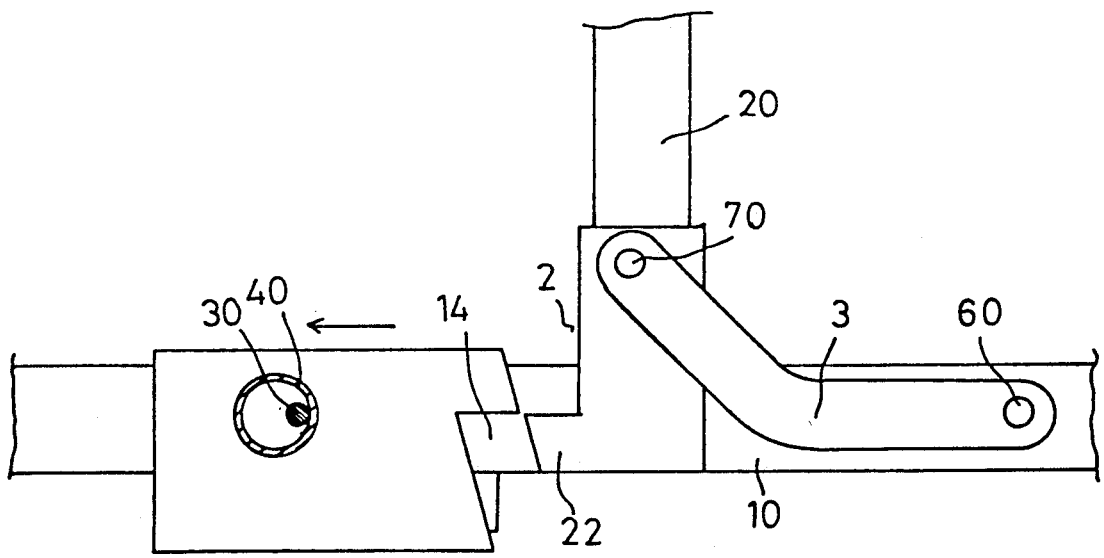
Figure 6B:
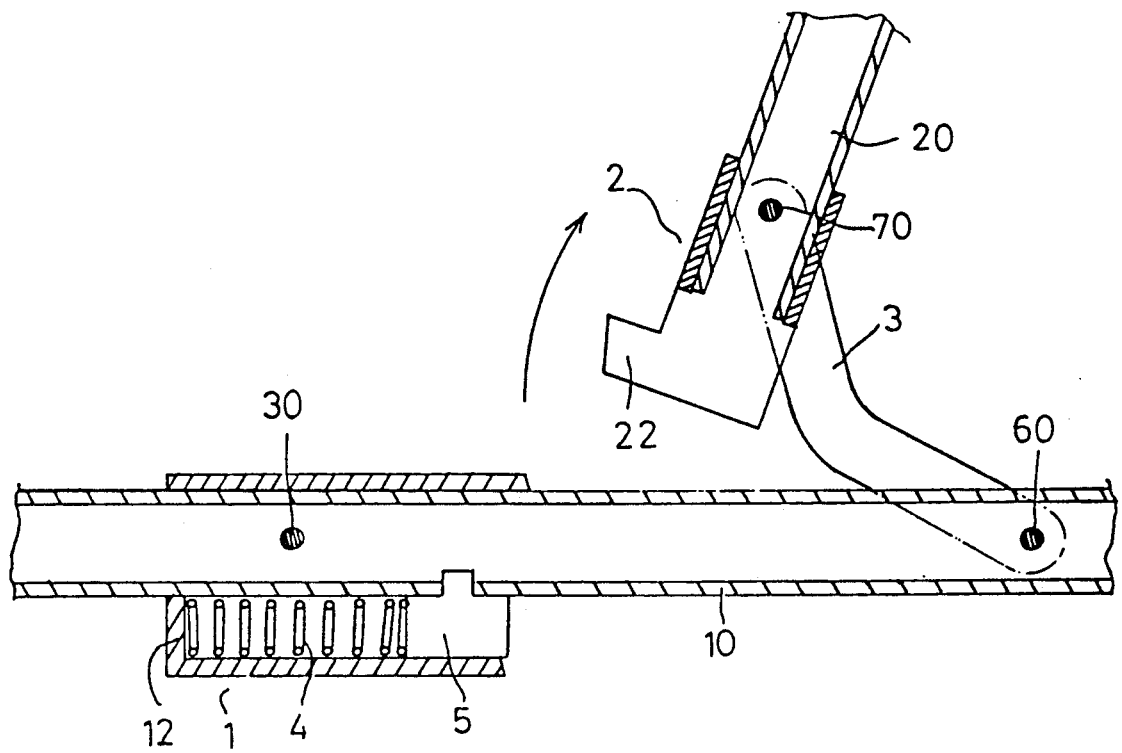
Figure 6A:
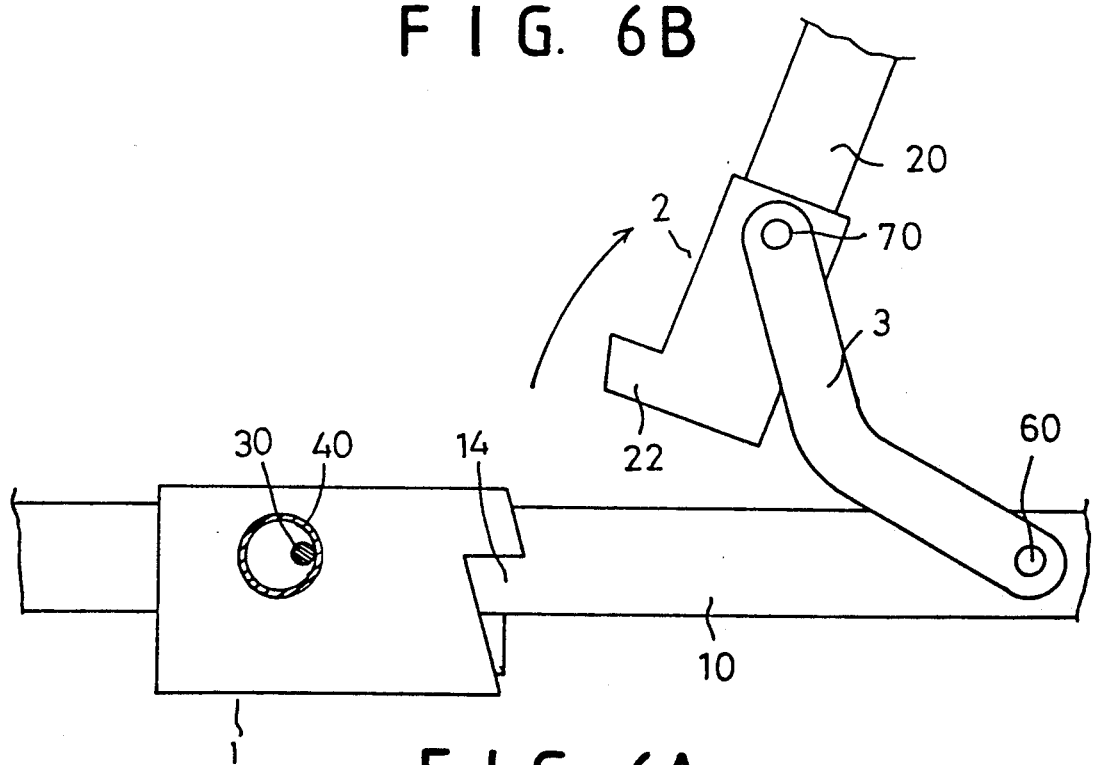
Figure 8:
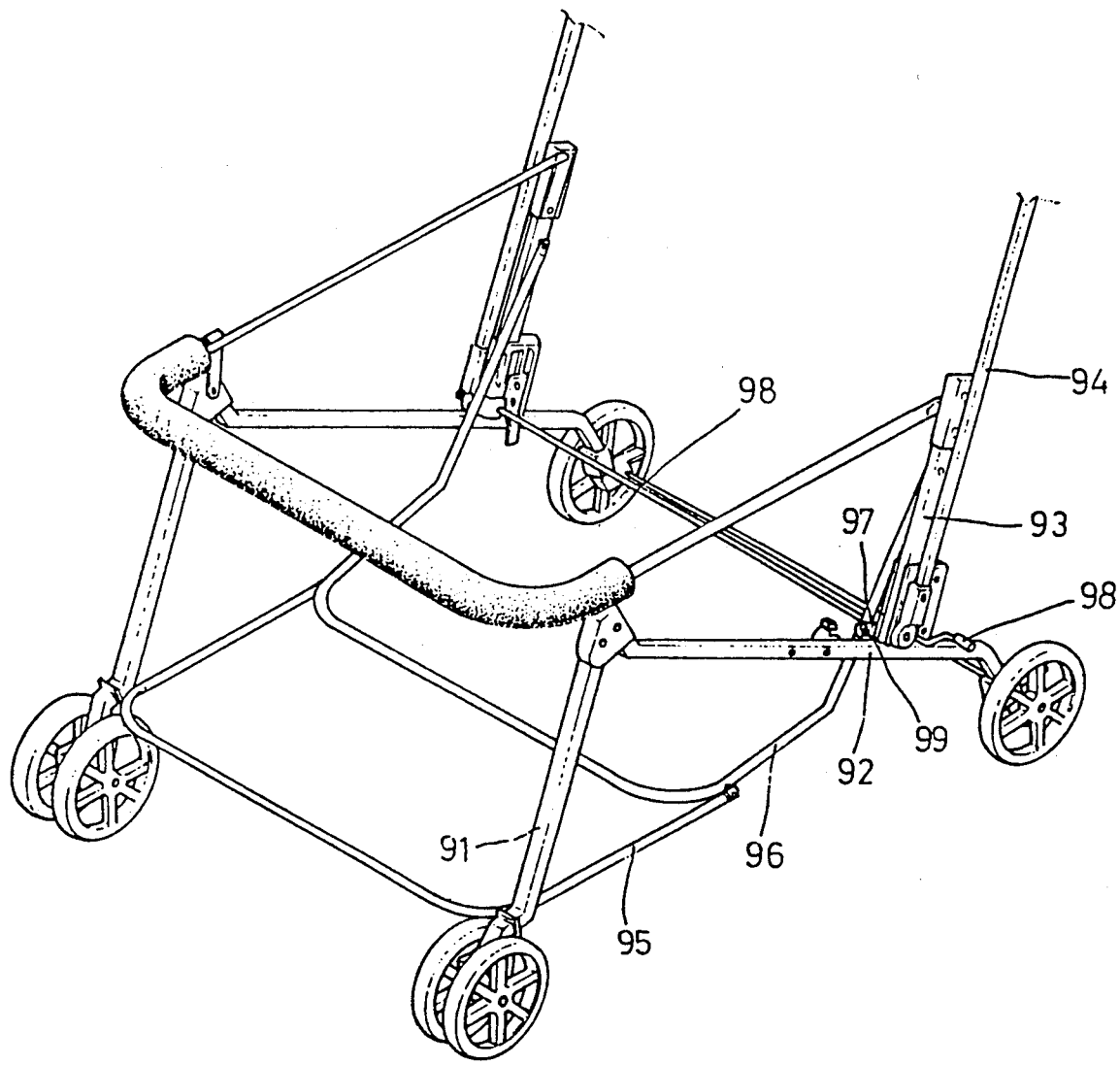
FIG. 8 shows a prior art engaging means for a baby stroller.

When the baby is carried upwards from the stroller, the weight exerted on the engaging member 1 by the baby will no longer exist and the spring 4 will push the engaging member 1 upwards thus separating the seat 2 from the lugs 22 of the seat 2 (see FIG. 5A and 5B). Meanwhile, the tube 40 is in contact with the screw 30 and kept in a fixed position (see FIG. 6) hence collapsing the stroller as shown in FIG. 7.

However, the auxiliary safety structure according to the present invention must be used in association with a locking device.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An auxiliary safety structure for a baby stroller comprising:

a rear stay connected with an engaging member, said engaging member being formed with a square through hole and a chamber in communication with the engaging member, said engaging member further having a tubular member at one side and a notch at an end;

a handle connected with a seat, said seat being formed with a recess sleeving over a lower end of said handle and having two lugs at a bottom;

a screw inserted through a tube said tubular member of said engaging member, said rear stay and said square hole of said rear stay to engage with a nut so that said tube is closely engaged with said tubular member of said engaging member;

a crank arm connecting said rear stay, said handle and said seat;

a block arranged within said chamber;

a spring disposed within said chamber and tending to push against said block;

whereby said stroller will be kept in expanded condition as long as there is a baby in said stroller thereby preventing the baby from being injured by accidental collapse of said stroller.

* * * * *